United States Patent [19]
Yonezawa

[11] 3,985,102
[45] Oct. 12, 1976

[54] DRYER APPARATUS FOR HAIRS OF PET DOGS

[76] Inventor: Shoji Yonezawa, 22-8, Hayamiya 1 chome, Nerima, Tokyo, Japan

[22] Filed: Oct. 6, 1975

[21] Appl. No.: 619,934

[30] Foreign Application Priority Data

Oct. 15, 1974   Japan.............................. 49-124412

[52] U.S. Cl.................................. 119/19; 34/235; 119/160
[51] Int. Cl.²........................................ A01K 13/00
[58] Field of Search................. 119/19, 1, 156–160, 119/33, 39, 99, 15, 17; 219/400; 34/243 R, 232–235, 218

[56] References Cited
UNITED STATES PATENTS

| | | |
|---|---|---|
| 3,023,734 | 3/1962 | Schaub .................................. 119/99 |
| 3,175,534 | 3/1965 | Pollard................................. 119/19 |
| 3,749,064 | 7/1973 | Weinstein et al................... 119/158 |

*Primary Examiner*—Louis G. Mancene
*Assistant Examiner*—Peter K. Skiff
*Attorney, Agent, or Firm*—Cullen, Settle, Sloman & Cantor

[57]   ABSTRACT

A box of transparent glass or synthetic resin for a pet dog, its front wall is a door to let in and out the dog, the side walls of the box each having an opening to allow the arms of a person who takes care of the dog to get in the box and a lid member in the top of the box is provided with dryer means consisting of a heater and fan so that the dog can be seen from the outside of the transparent box to enable to the person to dress the hairs of the pet dog in the box with his hands.

1 Claim, 3 Drawing Figures

DRYER APPARATUS FOR HAIRS OF PET DOGS

Conventionally in taking care of hairs of dogs, there was not provided any room specially designed for the treatment of dogs, nor was there provided any dryer to be used in kennels. Often a hand dryer for the use of man was applied for dressing hairs of dogs. In such instance, usually one held a hand dryer with his one hand and brushed the dog with the other hand. If the dog became violent, working could not be achieved well. Since he had to hold the dryer with his one hand, and made brushing with the other hand, the portion of the hair root would not well dry and moisture remained on the pelage and in which portion when later dried up, hairs were given another orientation (wave flow) than that of hairs already dried by dryer. This could not give a nice looking coat to the dog.

If the dog fully moistured with bathing shakes himself in a peculiar manner of the dog, water drips splash to soil and makes the room dirty. Only with scattering of hairs fallen at the time of brushing, the room becomes dirty and this is injurious to man health. Further in winter, dogs tend to catch cold after bathing because of low temperature in the room.

The present invention is aimed to solve these problems.

Therefore one object of the present invention is to completely remove moisture remaining in the hair roots and pelage of the dog after he takes a bath so as to maintain his good looking hairs.

Other object of the present invention is to avoid the dog after he takes a bath and hair-dressed from catching cold due to the low temperature in the room.

Another object of the present invention is to provide a box for the treatment of a dog which enables to attend him only by one person instead of several persons so far needed in doing so.

Further object of the present invention is to provide a box thereby when attending a dog to avoid its falling hairs from scattering or when he himself shakes, to avoid water drips from splashing to soil therearound.

Other objects and advantages of the present invention will become more apparent as description proceeds with reference to accompanying drawings in which.

Figure 1:
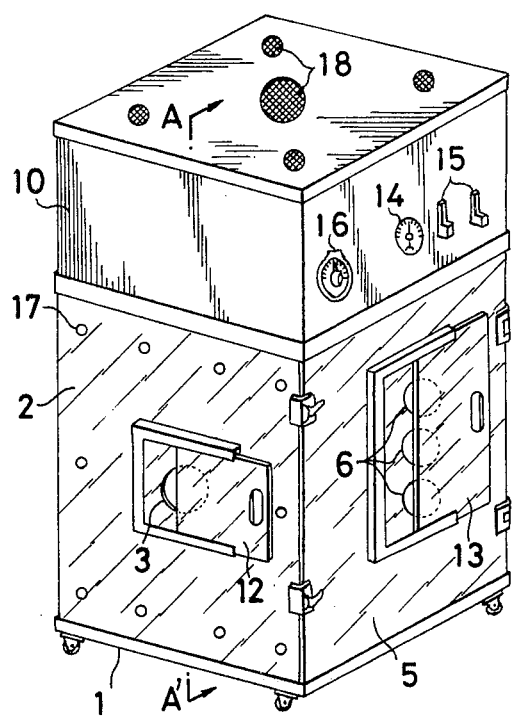
FIG. 1 is a perspective view of a coat dryer apparatus for pet dogs of the present invention.
Figure 2:
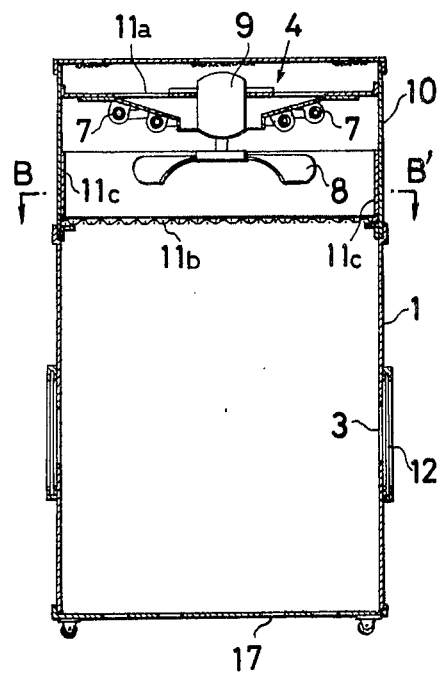
FIG. 2 is a cross section view of the apparatus taken along the line A—A in FIG. 1.
Figure 3:
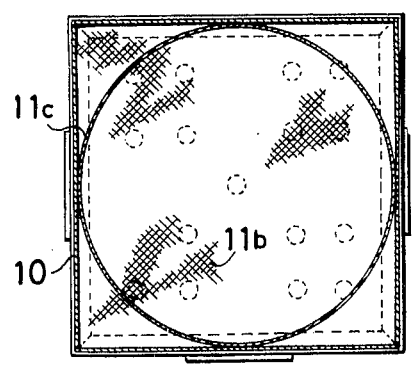
FIG. 3 is a cross section view of the apparatus taken along the line B—B in FIG. 2.

In drawings, 1 is a dryer box made of transparent glass or synthetic resin. It does not always require to make the whole box transparent. Only the front side may be made of transparent material if the inside of the box can be well therethrough. The front side of the box 1 is an openable door 5. A plurality of apertures 6 are provided in the central portion of the door 5. Each aperture 6 is so dimensioned that the nose of a dog can slightly get out.

The side walls 2, each has an opening 3 large enough that the hands of a person who takes care of the dog can enter. These apertures 6 and openings 3 can be closed with cover plates 12 and 13 respectively so that dusts or foreign matter can not enter when the box is not in use.

The door apertures 6, of which there are three for illustration, are of different height to accommodate dogs of different height. The dog's nose may project outwardly of said apertures.

A lid member 10 is placed at the top of the box 1. The lid member 10 is provided with a dryer apparatus 4 including a heater 7, fan 8 and motor 9. The dryer apparatus 4 is attached to an inner plate 11a. A wire net 11b is provided below the fan 6 so that fallen hairs of the dog do not deposit on the dryer apparatus. Also a partition palte 11c is provided to the lid member 10 so that hot air may be uniformly flown. In drawings, 14 is a thermometer. 15 are a switches to operate the dryer apparatus. 16 is a thermostat. 17 are ventilation apertures and 18 are wire nets.

Now let us explain the state of use of this dryer apparatus of the present invention. A dog after bathing and hair-washed is put in the box from the opened door 5. In this instance, cover plates 12 and 13 on the apertures 6 and the openings 3 are removed respectively. Then the attendant stretches his arms in the opening 3 and wipes the dog body with a towel as the dog can be seen well from the outside of the box. Thereafter the dryer apparatus 4 is operated to produce hot air to dry the hairs and skin of the dog. In this instance, the dog is held with one hand and brushing is made with the other hand with a brush. Or such brushing is made while raising hairs of the dog with fingers of one hand thus it enables to completely remove moisture on the skin.

In this working, if the temperature in the box rises with hot air, yet the dog can breath well as his nose can get out the aperture 6 of the front door so that he does not have any pain. Therefore the dog will not behave violently and squeak due to pain. Since the hot air flows to every corner of the box by virtue of the circular partition plate, if the dog seats in a corner, he can be treated well as just he seats in the center of the box. Since the wire net is placed, hairs fallen from the dog at the time of brushing will be caught by the wire net. Therefore fallen hairs will not deposite on the dryer apparatus to make it burn.

What is claimed is:

1. Dryer apparatus for hairs of pet dogs consisting of a transparent box (1) having a door at its front side, and a lid member (4) therabove provided with dryer apparatus including a heater, fan and motor, said dryer apparatus further comprising:

A. a plurality of vertically spaced aligned apertures (6) in the central portion of the door, for different heights of dogs so that the nose of the dog can slightly project outwardly of one of said apertures, a cover plate (13) slidably mounted on the door to cover said door openings and adjustably open them; there being an opening (3) in each side wall of the box large enough to receive the hands of a dog attendant; a cover plate (12) slidably mounted on each side wall covering the side wall openings and adapted to open them;

B. a transverse upper plate (11a) within and suspended from the lid (10) to which the dryer apparatus (4) consisting of a heater (7), fan (8) and motor (9) are suspended; a cylindrical partition plate (11c) inside of and mounted on the lid for uniformly directing heated air downwardly; and a wire net (11b) at the bottom of the lid to keep dog hair from the dryer apparatus; said lid having a series of vent apertures therein and wire nets (8) on the lid top face covering said apertures.

* * * * *